United States Patent [19]

McLane et al.

[11] Patent Number: 4,489,772

[45] Date of Patent: Dec. 25, 1984

[54] DRUM FOR CONTINUOUS CASTING MACHINE

[75] Inventors: Jack E. McLane, Port Huron; Raymond L. Schenk, Marysville; John W. Wirtz, Port Huron, all of Mich.

[73] Assignee: Wirtz Manufacturing Company, Inc., Port Huron, Mich.

[21] Appl. No.: 423,997

[22] Filed: Sep. 27, 1982

[51] Int. Cl.³ .................... B22D 11/00; B22D 11/124
[52] U.S. Cl. .................... 164/423; 164/463; 164/479; 164/429; 164/485; 164/443
[58] Field of Search .......... 164/463, 423, 479, 480, 164/482, 427, 428, 429, 433, 485, 443; 165/89; 29/117, 124; 411/479; 403/292, 297

[56] References Cited

U.S. PATENT DOCUMENTS

| | | | |
|---|---|---|---|
| 2,737,843 | 3/1956 | Koehl | 411/479 |
| 3,426,839 | 2/1969 | Overton | 165/89 |
| 3,537,506 | 11/1970 | Griffiths | 164/429 |
| 3,901,622 | 8/1975 | Ricketts | 403/292 X |
| 4,307,771 | 12/1981 | Draizen et al. | 164/423 X |
| 4,349,067 | 9/1982 | Wirtz et al. | 164/479 |
| 4,415,016 | 11/1983 | McLane et al. | 164/479 X |

FOREIGN PATENT DOCUMENTS

| | | | |
|---|---|---|---|
| 2505878 | 9/1976 | Fed. Rep. of Germany | 411/479 |
| 68559 | 6/1981 | Japan | 164/485 |

Primary Examiner—Kuang Y. Lin
Assistant Examiner—P. Weston Musselman, Jr.
Attorney, Agent, or Firm—Barnes, Kisselle, Raisch, Choate, Whittemore & Hulbert

[57] ABSTRACT

A continuous casting machine for battery grids includes a rotary drum on the outer peripheral surface of which the battery grid pattern is formed by a series of grooves. The peripheral surface of the drum mates with a shoe through which molten lead is directed into the grooves as the drum rotates. The outer periphery of the drum is a shell that is connected to rotary side plates by means of roll pins that enable the shell as a whole to expand and contract independently of the side plates. The drum is maintained at a desired temperature to solidify the molten lead directed into the grooves of the battery grid pattern by circulating a heated liquid through the drum.

4 Claims, 10 Drawing Figures

DRUM FOR CONTINUOUS CASTING MACHINE

This invention relates to a machine for continuously casting battery grids and, more particularly, to a casting drum for such machine.

It has been proposed heretofore to continuously cast battery grids by directing a molten lead alloy against a rotary drum having on the outer peripheral surface thereof a plurality of grooves corresponding to the battery grid pattern. The molten alloy is directed against the drum through an orifice slot formed in a metal shoe which has a close fit with a limited arcuate portion of the peripheral surface of the drum. Such an arrangement is shown in U.S. Pat. No. 4,349,067, issued on Sept. 14, 1982, which is owned by the assignee of this application.

One of the problems encountered with battery grid casting machines of the type described is that, unless the mating surfaces of the shoe and the drum are at all times in close sliding engagement around the entire periphery of the orifice, molten lead will flash therebetween and thus produce unacceptable grids. The close mating fit between the drum and the shoe can be maintained only if the surface of the drum is prevented from distorting axially. Since molten alloy is directed against the periphery of the drum, it follows that the drum will expand radially as its temperature is elevated. However, if the opposite end portions of the drum are prevented from expanding, or expand at a greater rate than the axially central portion of the drum, then it follows that the peripheral surface of the drum will assume a slight arcuate contour in an axial direction and will not mate perfectly with the cooperating concave surface of the shoe.

The present invention has for its primary object the elimination of objectionable distortions of the outer periphery of the drum in an axial direction.

A more specific object of this invention is to provide a drum for a battery grid casting machine wherein the outer periphery of the drum comprises a circular cylindrical shell that is mounted on a pair of side plates in a manner which permits the shell as a whole to expand radially or circumferentially in a uniform manner relative to the side plates.

Another object of this invention is to provide means for maintaining the temperature of the peripheral surface of the drum at a substantially constant desired value.

Other objects, features and advantages of the present invention will become apparent from the following description and accompanying drawings, in which.

Figure 1:
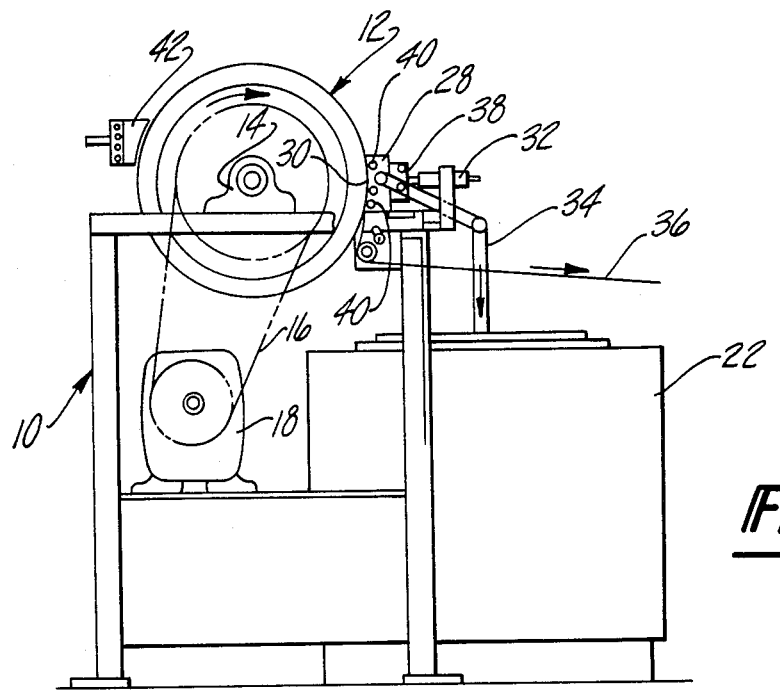
FIG. 1 is a side elevational view of a battery grid casting machine which employs a drum embodying the present invention.
Figure 2:
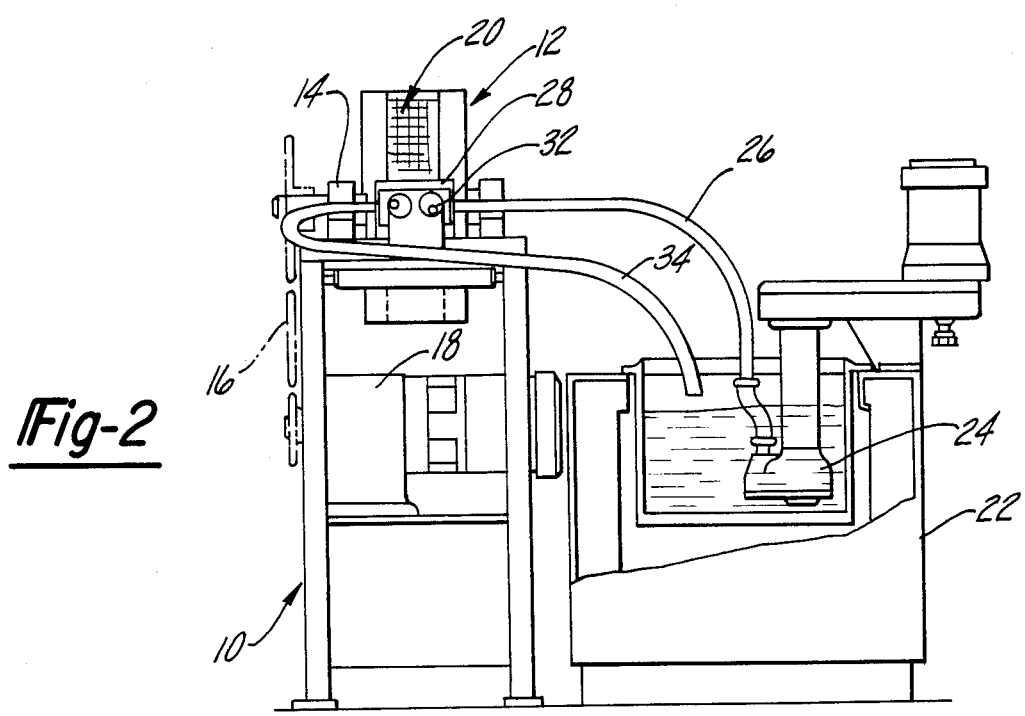
FIG. 2 is a side elevational view of the casting machine illustrated in FIG. 1.
Figure 5:
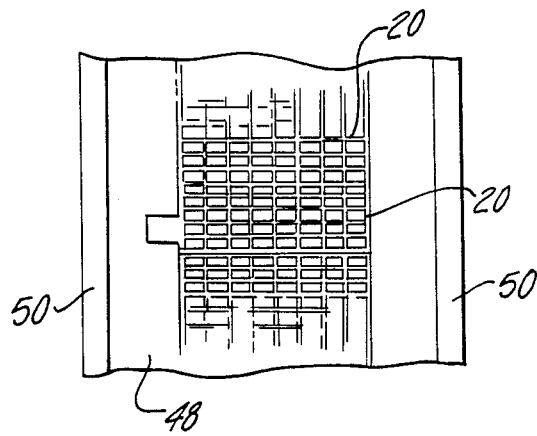
FIG. 5 is a fragmentary plan view of the drum showing the grid pattern machined thereon.

Referring first to FIGS. 1 and 2, the battery grid casting machine of the present invention comprises a frame 10 on which a battery grid casting drum 12 is journalled for rotation by pillow blocks 14. Drum 12 is rotated by means of a suitable belt or chain drive 16 from a variable speed motor 18. As is shown in FIG. 5, the outer peripheral surface of drum 12 has a plurality of circumferential and transverse grooves 20 machined therein which define the desired pattern of the battery grid to be cast. Molten lead from a lead pot 22 is directed by means of a motor driven pump 24 through a conduit 26 and into a shoe 28. Shoe 28 has a concave face 30 which mates with the peripheral surface of drum 12. Suitable clamp screws 32 are utilized for maintaining shoe 28 in desired pressure engagement with the outer peripheral surface of drum 12. Within shoe 28 there is provided an orifice slot (not illustrated) which is open at face 30 across the grid pattern on the drum. This orifice has an inlet communicating with conduit 26 and an outlet communicating with conduit 34. The general arrangement is shown and described in the aforementioned patent.

With the above described arrangement molten lead under superatmospheric pressure is directed from lead pot 22 through conduit 26 and into the orifice slot in shoe 28. As the drum 12 rotates, the molten lead fills the grooves 20 to thereby form the desired battery grid in a continuous manner and the excess molten lead is directed back into the lead pot 22 by conduit 34. The continuously cast battery grid, in the form of a strip designated 36, is stripped from the peripheral surface of drum 12 and, after desired processing, is severed into individual battery grids. Shoe 28 is provided with suitable heaters 38 on the rear face thereof and is also provided with suitable coolant passageways 40 to minimize distortion of the shoe and to maintain various portions of the shoe at desired temperatures. The periphery of drum 12 is maintained at a desired uniform temperature by the hereinafter described liquid circulation system and preferably also by a plurality of thermocouple controlled water spray nozzles 42 adjacent the periphery of the drum and spaced circumferentially from shoe 28. In practice it has been found that with a drum having a width of about five to seven inches, three axially spaced cooling zones each provided by nozzles 42 are adequate to maintain the periphery of the drum at a substantially uniform temperature axially. The peripheral surface of the drum must be maintained at a uniform temperature below the melting temperature of the lead in order to quickly solidify the molten lead before the filled grid pattern rotates out of contact with shoe 28.

Figure 3:
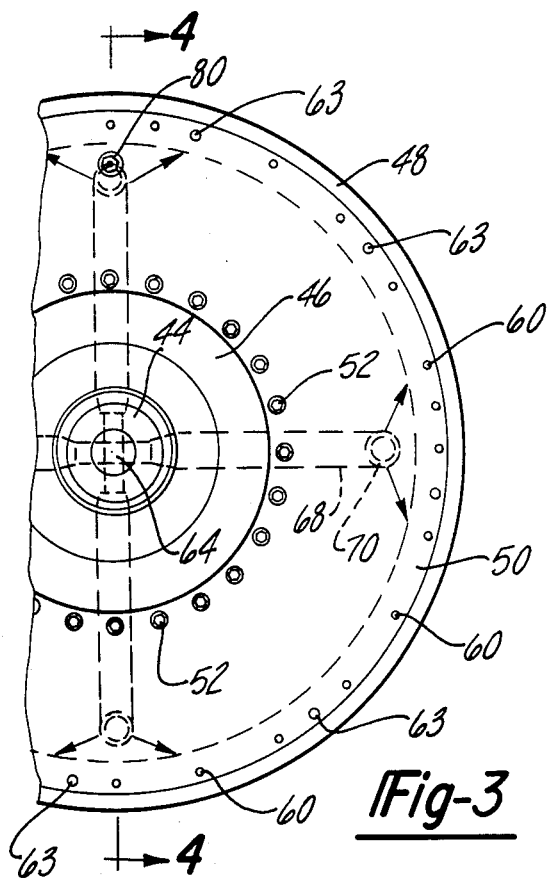
FIG. 3 is a fragmentary side elevational view of the drum on an enlarged scale.
Figure 4:
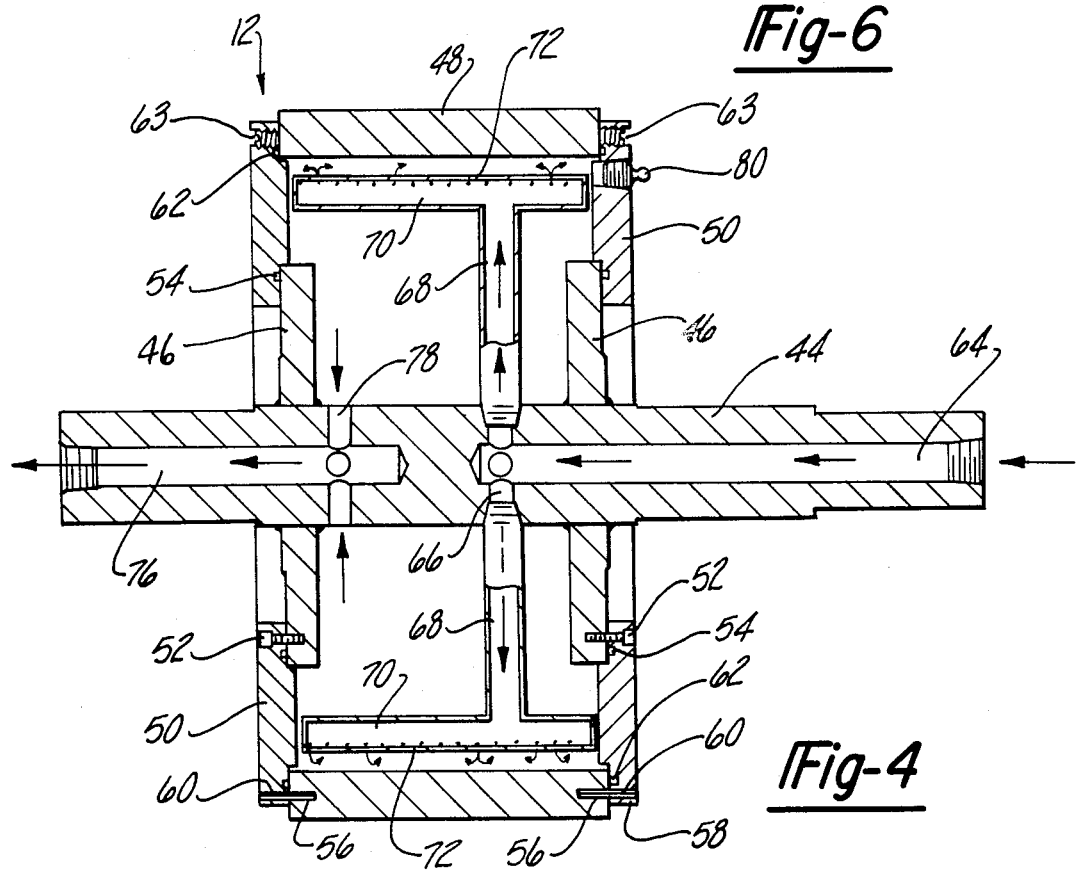
FIG. 4 is a sectional view along the line 4—4 in FIG. 3.

Referring more particularly to FIGS. 3 and 4, the shaft 44 which is journalled in pillow blocks 14 has a pair of circular steel discs 46 fixed thereon as by welding in axially spaced relation. The drum itself consists of a circular cylindrical shell 48, preferably formed of cast iron, having a pair of steel side plates 50 at each end thereof. Side plates 50 are releasably mounted on the outer faces of discs 46 by means of screws 52. O-rings 54 provide a sealed connection between discs 46 and side plates 50.

Figure 6:
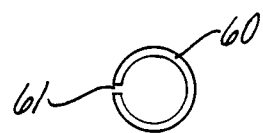
FIG. 6 is an end view of a roll pin employed for mounting the shell on the side plates of the drum.

The opposite end faces of shell 48 are formed with axially extending openings 56 which, when the drum is assembled, are aligned with openings 58 of the same size spaced around the outer peripheral edge portions of the two side plates 50. Shell 48 is mounted on side plates 50 by means of resilient roll pins 60 extending axially through the registering openings 56,58. Roll pins 60, as illustrated in FIG. 6, are of the conventional type and consist of a sheet of spring material rolled into cylindrical shape with the opposite edges spaced slightly apart as at 61 so as to enable the roll pins to circumferentially expand and contract. When the drum is initially assembled at room temperature, roll pins 60 have a very close and tight fit in the registering openings 56,58. The width of shell 48 is accurately dimensioned so that it will have a close fit between mounting plates 50 when the latter are secured to discs 46. The joint between each side plate and the shell is sealed by O-rings 62. The outer peripheral edge portion of each side plate 50 is also provided with a plurality of jack screws 63 which can be advanced into abutting engagement with the end faces of shell 48 to disengage the side plates 50 from shell 48 after the screws 52 which mount the side plates 50 on the disc 46 are removed.

Shaft 44 is formed with an inlet passageway 64 adapted to be connected to a liquid reservoir (not shown), such as oil, which may be heated, for example, to a temperature of about 250° F. The inlet passageway 64 terminates in shaft 44 within the drum in a plurality of radial ports 66 in which radially extending pipes 68 are threaded. Four are shown but a greater number could be used. The outer end of each pipe 68 communicates with an axially extending pipe 70 disposed radially adjacent the inner peripheral surface of shell 48. Each pipe 70 is formed with a plurality of radially outwardly directed openings 72 which, when liquid under pressure is admitted to inlet passageway 64, causes the liquid to be sprayed toward, but without localized impingement, against the inner peripherial surface of shell 48. The axes of openings 72 are angularly inclined relative to the inner surface of shell 48 so as to produce turbulence of the oil and, thus, promote effective and uniform heat transfer between the oil and drum. Inasmuch as the oil and shell are of a different mass and substance, the oil would have a tendency to remain somewhat stationary while the drum is rotating. The radially and axially extending pipes act as agitators for dispersing and mixing the cooler and hotter oil to improve the heat transfer mechanics. The opposite end of shaft 44 is formed with a central exhaust passageway 76 which communicates with the interior of drum 12 by means of four radially directed ports 78. The outer end of passageway 76 is connected by an exhaust conduit (not shown) with the reservoir of heated liquid. Initially drum 12 is adapted to be filled with the heated liquid by closing exhaust passageway 76 and directing liquid into the drum through inlet passageway 64 and simultaneously opening a vent valve 80 located in one of the side plates 50 of the drum. When the drum is initially filled with liquid it is rotated to a position wherein valve 80 will be located adjacent the top of the drum.

When the machine is initially set in operation the drum 12 is filled with oil heated to a temperature of about 250° F. After a short period of time the temperature of the drum is elevated from room temperature to the temperature of the oil circulated therethrough. The shoe 48 is also heated by means of the heating units 38 to a substantially higher temperature; for example, 400° to 500° F. After the temperature of the various components have stabilized, pressurized molten lead at a temperature of, for example, 800° to 900° F., is circulated between the lead pot and the orifice slot in shoe 48. As the drum 12 is rotated and lead is directed into the grid cavities formed by grooves 20, the temperature of the shell at least locally adjacent the orifice slot is elevated to above 250° F. It therefore follows that when the machine is in operation the temperature of the drum is substantially above room temperature. Likewise, the shell 48 and the side plates 50 and discs 46 become heated to different and frequently changing temperatures. However, the roll pins 60 enable the shell to expand and contract independently of side plates 50. As shell 48 expands and contracts relative to side plates 50, roll pins 60 contract and expand and thus provide a radially resilient connection between the shell and side plates. This enables the shell 48 to retain its cylindrical shape and thus remain in close mating engagement with the arcuate surface 30 of shoe 28 over a substantially wide range of temperatures.

Since battery grids are designed to enhance battery performance, the lead is distributed to decrease the resistance of the grid. This type of design does not distribute the lead evenly throughout the grid and can even cause concentrated or high mass areas. These high concentrated areas can cause hot spots during casting and uneven expansion in certain areas of the shell. To overcome this a series of cavities is formed on the inside of the shell to increase the surface area in these localized hot spots. FIGS. 7 through 10 show two ways of several to increase the heat removal capacity in localized areas.

Figure 7:
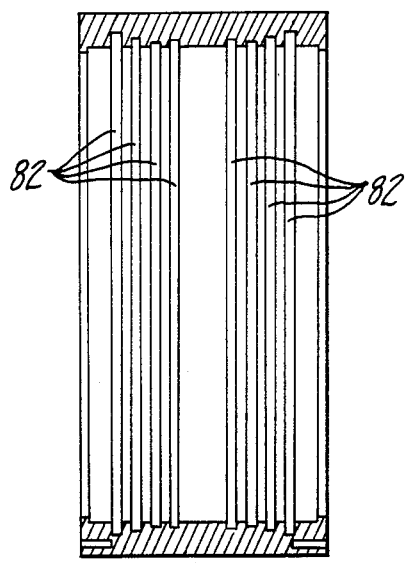
FIG. 7 is a sectional view of a modified form of shell.
Figure 8:
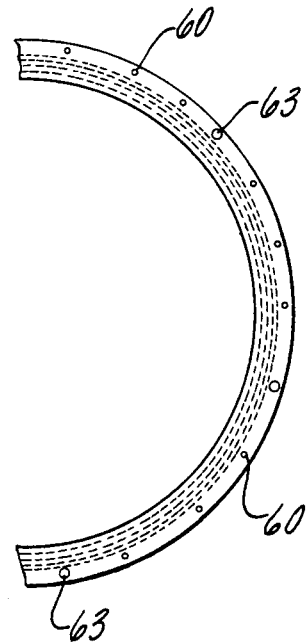
FIG. 8 is a fragmentary end view of the shell shown in FIG. 7.

The shell shown in FIGS. 7 and 8 has on the inner periphery thereof a series of four circumferentially extending grooves 82 at each side thereof. The grooves 82 are of progressively increasing depth in an axially outward direction. A cavity configuration of the type illustrated in FIGS. 7 and 8 could be used where the grids cast on the drum have opposite ends thereof of progressively greater mass than the central portion thereof.

Figure 9:
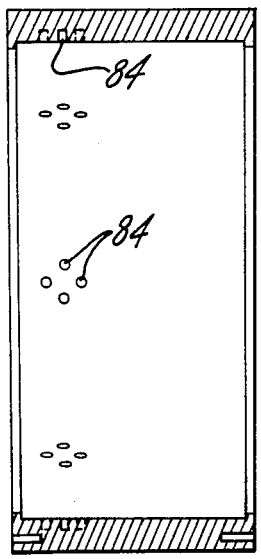
FIG. 9 is a sectional view of another modified form of shell.
Figure 10:
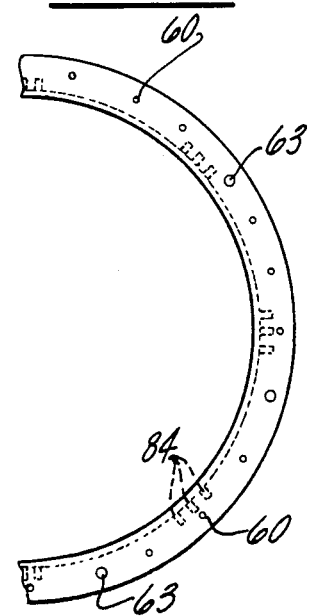
FIG. 10 is a fragmentary view of the shell shown in FIG. 9.

In the shell shown in FIGS. 9 and 10 the cavity configuration on the inside of the drum consists of circumferentially spaced groups of four blind holes 84. Such a cavity arrangement could be used for casting grids having a heavy mass at one corner portion thereof.

We claim:

1. In a machine for continuously casting battery grids, the machine being of the type which includes a rotating drum having a cavity on the outer peripheral surface thereof which defines the battery grid pattern and a shoe through which molten lead is directed, said shoe having an arcuate surface in mating engagement with an arcuate portion of the outer peripheral surface of the drum and also having in said surface an orifice slot for directing the molten lead into said recessed grid pattern, said drum having an inlet and an outlet for circulating coolant therethrough, the improvement wherein said drum comprises a central rotatable support shaft, a pair of discs mounted on said shaft in fixed axially spaced relation, said discs having axially outer faces lying in accurately parallel planes perpendicular to the rotating axis of the shaft, a pair of annular side plates releasably mounted against said outer faces of the two discs and in sealed relation therewith, said side plates extending radially outwardly beyond the outer peripheries of said discs, the axially inner opposed faces of said side plate having flat, radially outer annular surface portions lying in accurately parallel planes perpendicular to said rotary axis, a shell having axially extending inner and outer peripheral surfaces and axially opposite end surfaces extending radially between and intersecting said inner and outer peripheral surfaces, the radial dimension of said end faces being approximately the same as the maximum radial thickness of the shell between its opposite ends, said end faces being flat and lying in accurately parallel planes perpendicular to said rotary axis, said radially outer annular surface portions of said side plates being in abutting and sealed overlapping relation with said flat end faces of the shell, the flat overlapping surface portions of the side plates and the end faces of the shell having a plurality of registering, axially extending openings therein and a plurality of pins frictionally engaged in said registering openings, said pins being radially compressible throughout their length to accommodate radial thermal expansion and contraction of the shell relative to the side plates.

2. A drum as called for in claim 1 wherein said pins comprise sheet metal roll pins.

3. A drum as called for in claim 2 wherein said roll pins have a close fit within the openings in the shell and side plates when the drum is at room temperature.

4. A drum as called for in claim 3 including jack screws around the outer peripheral edge portions of said side plates adapted to be advanced into engagement with the end faces of the shell to permit axial separation of the side plates from said shell when the side plates are disconnected from said discs.

* * * * *